United States Patent
Wada

[11] Patent Number: 5,758,628
[45] Date of Patent: Jun. 2, 1998

[54] ABNORMALITY DETECTION APPARATUS

[75] Inventor: Shuichi Wada, Kobe, Japan

[73] Assignee: Mitsubishi Denki Kabushiki Kaisha, Tokyo, Japan

[21] Appl. No.: 850,502

[22] Filed: May 2, 1997

[30] Foreign Application Priority Data

May 7, 1996 [JP] Japan ................... 8-112645

[51] Int. Cl.$^6$ ........................................ F02M 37/04
[52] U.S. Cl. ........................ 123/520; 123/198 D
[58] Field of Search ...................... 123/520, 521, 123/519, 518, 516, 198 D

[56] References Cited

U.S. PATENT DOCUMENTS

| | | | |
|---|---|---|---|
| 5,178,117 | 1/1993 | Fujimoto | 123/519 |
| 5,477,842 | 12/1995 | Maruyama | 123/519 |
| 5,520,160 | 5/1996 | Aota | 123/520 |
| 5,535,719 | 7/1996 | Morikawa | 123/520 |
| 5,613,481 | 3/1997 | Kitagawa | 123/520 |
| 5,638,795 | 6/1997 | Hara | 123/520 |
| 5,676,118 | 10/1997 | Saito | 123/520 |
| 5,699,775 | 12/1997 | Azuma | 123/520 |

FOREIGN PATENT DOCUMENTS 5-125997  9/1993  Japan.

Primary Examiner—Carl S. Miller
Attorney, Agent, or Firm—Sughrue, Mion, Zinn, Macpeak & Seas, PLLC

[57] ABSTRACT

An abnormality detecting apparatus for a purge control system is capable of making an abnormality determination in a reliable and safe manner without a feeling of wrongness. A purge amount of a fuel gas is controlled in accordance with an intake pressure in an intake pipe and an amount of fuel in a fuel tank when abnormality determination conditions are satisfied. If abnormality determination conditions exist, a concentration of a fuel gas in a canister is taken into consideration.

9 Claims, 12 Drawing Sheets

ABNORMALITY DETECTION APPARATUS

BACKGROUND OF THE INVENTION

1. Field of the Invention

The present invention relates to an abnormality detecting apparatus for a purge control system, and more specifically, to such an apparatus for detecting an abnormality or malfunction such as leakage of a fuel gas in the purge control system which serves to prevent evaporation of the fuel in a fuel tank.

2. Description of the Related Art

In the past, in order to prevent a fuel gas evaporated in a fuel tank installed on a vehicle such as a motor vehicle from being discharged into the ambient atmosphere, it is legally demanded that a vehicle should be provided with a purge control system or a fuel evaporation preventive system. In general, the fuel evaporation preventive system has a canister disposed on a purge conduit connecting between a fuel tank and an intake pipe, and the canister contains an adsorbent therein for adsorbing a fuel gas or vapor evaporated from the fuel in the fuel tank as required so that by controlling a purge control valve in the purge conduit in accordance with an operating state of an internal combustion engine, the fuel vapor thus adsorbed in the adsorbent can be discharged or introduced from the canister into the intake pipe at suitable timing to mix with an air/fuel mixture, thus preventing leakage of fuel vapor from the fuel supply system.

With this type of the purge control apparatus, there is generally formed a purge conduit such as a rubber hose connecting between the canister and the intake pipe. When the rubber hose is folded to be fattened, the fuel gas or vapor is blocked from being introduced into the intake pipe, thus resulting in a situation wherein the quantity of the fuel gas in the canister can exceed the fuel gas adsorbing capacity of the adsorbent received therein and is allowed to be discharged from an air port of the canister into the ambient atmosphere without being returned to the intake pipe. Moreover, the rubber hose being in contact with an alcoholic component may be injured or destroyed due to corrosion, and if the air port of the canister should be clogged with dust or the like, the rubber hose may be dislocated or put out of joint by virtue of a pressure rise. In this case, too, fuel gas or vapor is discharged into the atmosphere.

In order to detect such a situation, another system has been proposed, for example, in Japanese Patent Laid-Open No. 5-125997. In this system, a pressure sensor is disposed in a fuel tank for sensing the internal pressure therein, and when the detected pressure in the fuel tank exceeds a maximum pressure in the normal state, or when no appreciable pressure difference greater than a predetermined value is detected before and after opening and closing of a purge control valve in a purge conduit, it is determined that there is a failure or malfunction in the purge control system. With this arrangement, it is possible to accurately detect a failure or abnormality of the purge control system such as clogging of the air port of the canister, incapability of opening the purge control valve, breakage or dislocation of an intake-pipe-side portion of the purge conduit, etc.

In the above-mentioned abnormality detecting apparatus for a fuel purge control system, however, the amount of purged fuel gas used in effecting an abnormality determination is determined without taking into consideration a pressure in the intake pipe and the level or quantity of fuel in the fuel tank, so the internal pressure in the fuel tank does not often fall quickly due to a resistance to an air flow in the purge conduit, a variation in the volume of a space over the fuel in the fuel tank, thus making the time required for abnormality determination longer as well as inducing erroneous detection of abnormality, or on the contrary, the internal pressure in the fuel tank falls to an excessively low value, so there arises a possibility that the fuel tank is subjected to an abnormally low negative pressure and thus dented thereby.

Furthermore, due to the fact that no consideration is given to a concentration of fuel gas flowing from the canister into the intake pipe as one of abnormality determining conditions, there may be a possibility that the operation of the engine be adversely affected when fuel gas of a high concentration is supplied from the canister into the intake pipe.

Moreover, no consideration is given to the state of throttle opening as one of abnormality determining conditions, either, so that abnormality can be detected mistakenly when the opening degree of the throttle valve is great. This is because with the throttle opening being great, the negative pressure in the intake pipe is substantially limited, so that the internal pressure in the fuel tank does not fall at all even when the amount of purged fuel gas is made to a maximum value.

Also, no consideration is given to the amount of fuel in the fuel tank with a system in which failure or abnormality detection is substantially invalidated depending upon a quantity of change in the amount of fuel remaining in the fuel tank. Therefore, it is impossible, if the amount of fuel in the fuel tank is less or greater than a variation determination reference value, to correctly detect the operating state (e.g., running on a bad or irregular road, etc.) of a vehicle on which the abnormality detection apparatus is mounted. As a result, abnormality has sometimes been detected by mistake.

Further, since no consideration is given to the cumulative stoppage time of a vehicle in which the vehicle is cumulatively stopped as one of abnormality determining conditions, it is difficult to prevent incorrect abnormality defection due to a sudden change in the internal pressure in the fuel tank when a filler cap of a fuel tank is opened for the purpose of replenishing fuel during abnormality determining operation.

Still further, in cases where the filler cap of the fuel tank is opened or the rubber hose constituting a part of the purge conduit is taken off or dislocated or the like, the internal pressure in the fuel tank does not fall at all even when the amount of purged fuel gas is increased when abnormality determining conditions are established, so that it is impossible to make discrimination between occurrence of a true abnormality or failure and a special phenomenon in which there is an abundant fuel vapor gas generated in the fuel tank at a high temperature of the fuel. As a result, it becomes impossible to make an abnormality/normality determination, or a relatively long time is required for such a determination.

SUMMARY OF THE INVENTION

Accordingly, the present invention is intended to obviate the above-mentioned various problems encountered with the conventional abnormality detecting apparatuses, and has for its object to provide a novel and improved abnormality detecting apparatus for use with a purge control system in which the internal pressure in a fuel tank can be reduced to a target pressure value in a precise manner upon certain abnormality determining conditions being fulfilled, to thereby enable a speedy and accurate abnormality determination without imposing any substantial burden on the fuel tank.

Another object of the present invention is to provide a novel and improved abnormality detecting apparatus for use with a purge control system in which malfunction or disorder in the engine operation resulting from a fuel gas supplied from a canister to an intake pipe can be avoided when the abnormality determining conditions are established.

A further object of the present invention is to provide a novel and improved abnormality detecting apparatus for use with a purge control system which is capable of preventing incorrect detection of an abnormality when a vehicle having the apparatus installed thereon is traveling under a high load or on a bad road having surface irregularities or when a fuel tank mounted on the vehicle is replenished with fresh fuel.

A still further object of the present invention is to provide a novel and improved abnormality detecting apparatus for use with a purge control system which is capable of effecting a speedy and accurate abnormality determination even if a fuel gas in a fuel tank is permitted to escape to the ambient atmosphere from an opened filler port in the fuel tank when a filler cap for the filler port is opened or through a break or dislocation of a purge conduit such as a rubber hose at which the conduit or hose is broken or taken off.

Bearing the above objects in mind, according to the present invention, there is provided an abnormality detecting apparatus for a purge control system including a canister with a fuel adsorbent received therein disposed in a fuel purge conduit connecting between a fuel tank and an intake pipe of an internal combustion engine for adsorbing fuel gas generated in the fuel tank, and a purge control valve in the purge passage adapted to be controlled to be opened or closed in accordance with an engine operating state so as to introduce at appropriate timing the adsorbed fuel gas into the intake pipe for preventing evaporated fuel gas from discharged into the ambient atmosphere. The apparatus comprises: sensor means for sensing the engine operating state; abnormality determination condition detecting means for detecting, based on the engine operating state sensed by the sensor means, whether abnormality determination conditions for the fuel purge system are established; air port closing means for closing an air port formed in the canister; closed loop forming means for closing the purge control valve and the air port closing means to thereby form the entire fuel purge system into a single closed space; fuel tank internal pressure sensing means for sensing an internal pressure in the fuel tank; abnormality detecting means for detecting the presence of abnormality in the fuel purge system based on the result of detection of the fuel tank internal pressure sensing means; intake pressure sensing means for sensing a pressure in the intake pipe; and purge control means for controlling an amount of purged fuel depending upon the sensed intake pressure when the abnormality determination condition are established.

With this arrangement, when the abnormality determining conditions are met, the fuel tank internal pressure can be dropped to a target pressure in a precise manner, thus enabling speedy and exact abnormality determination without giving any substantial burden to the fuel tank.

In a preferred form of the invention, the abnormality detecting apparatus further comprises fuel amount sensing means for sensing an amount of fuel in the fuel tank, wherein the purge control means controls the amount of fuel purge in accordance with the amount of fuel in the fuel tank sensed by the fuel amount sensing means. When the abnormality determination conditions are established this arrangement enables the fuel tank internal pressure to be dropped to the target pressure more precisely, thus providing much speedy and accurate abnormality determination.

In a further preferred form of the invention, the abnormality detecting apparatus further comprises fuel gas concentration sensing means for sensing a concentration of a fuel gas flowing from the canister into the intake pipe. When the concentration of the fuel gas sensed by the fuel gas concentration sensing means is greater than a predetermined value, the abnormality determination condition detecting means determines that the abnormality determination conditions are not established. With this arrangement, when the concentration of the fuel gas is high, the purge control is effected in an ordinary manner irrespective of the intake pressure, thus preventing engine trouble due to the fuel gas supply from the canister when the abnormality determining conditions are established.

In a further preferred form of the invention, when the concentration of fuel gas has not yet been sensed by the fuel gas concentration sensing means, the abnormality determination condition detecting means determines that the abnormality determination conditions are not established. With this arrangement, when the fuel gas concentration has not been sensed, the purge control is effected in an ordinary manner irrespective of the intake pressure, thus preventing engine trouble due to the fuel gas supply from the canister when the abnormality determining conditions are established.

In a further preferred form of the invention, the sensor means comprises an idle time measuring sensor for measuring a duration time of the engine idling condition. When the duration time of the engine idling condition measured by the idle time measuring sensor is greater than a predetermined time, it is determined that the concentration of fuel gas has not yet been sensed by the fuel gas concentration sensing means, and the abnormality determination condition detecting means determines that the abnormality determination conditions are not established. With this arrangement, when the idle duration time is greater than the predetermined time, the purge control is effected in an ordinary manner irrespective of the intake pressure, thus preventing engine trouble due to the fuel gas supply from the canister when the abnormality determining conditions are established.

In a further preferred form of the invention, the sensor means comprises a throttle sensor for sensing an opening degree of the throttle valve. When the opening degree of the throttle valve sensed by the throttle sensor is greater than a predetermined value, the abnormality determination condition detecting means determines that the abnormality determination conditions are not established.

In a further preferred form of the invention, the abnormality detecting apparatus further comprises fuel amount variation sensing means for sensing an amount of fuel variation in the fuel tank and substantially invalidating the abnormality detection of the abnormality detection means when the amount of fuel in the fuel tank sensed by the fuel amount sensing means varies by more than a predetermined variation determining value. The variation determining value in the fuel amount variation sensing means is changed depending upon the amount of fuel in the fuel tank. This serves to prevent incorrect detection of abnormality in cases where the reading of the fuel amount sensing means does not indicate an exact amount of fuel remaining in the fuel tank such as when the vehicle is running on a bad road.

In a further preferred form of the invention, the sensor means comprises a speed sensor for sensing a speed of a vehicle on which the internal combustion engine is installed. The abnormality detecting apparatus further comprises vehicle stoppage cumulative time measuring means for measuring a length of cumulative time of the vehicle stoppage when the abnormality determination conditions are established is satisfied. When the vehicle stoppage cumulative time measured by the vehicle stoppage cumulative time measuring means is greater than a predetermined value, the abnormality detection of the abnormality detection means is invalidated. This arrangement serves to prevent incorrect detection of abnormality when the vehicle is stopped in a long period of time more than the predetermined time such as during refueling.

In a further preferred form of the invention, the abnormality detecting apparatus further comprises: cumulative purge time measuring means for measuring a cumulative purge time after engine starting; maximum fuel tank internal pressure storing means for storing a maximum value of the internal pressure in the fuel tank after engine starting; and minimum fuel tank internal pressure storing means for storing a minimum value of the internal pressure in the fuel tank after engine starting. An abnormality of the fuel purge system is determined based on the maximum and minimum values of the fuel tank internal pressure measured when the cumulative purge time measured by the cumulative purge time measuring means reaches a predetermined time. With this arrangement, even if there exists a large amount of fuel leakage which would be caused due to an open filler cap of the fuel tank, dislocation of the purge conduit such as a rubber hose, etc., the fuel tank internal pressure, remaining substantially unchanged nearly at the atmospheric pressure, is advantageously utilized for providing speedy and reliable abnormality detection.

The above and other objects, features and advantages of the present invention will become more readily apparent from the following detailed description of preferred embodiments of the invention when taken in conjunction with the accompanying drawings.

BRIEF DESCRIPTION OF THE ACCOMPANYING DRAWINGS

DESCRIPTION OF THE PREFERRED EMBODIMENTS

Preferred embodiments of the present invention will be described below in detail while referring to the accompanying drawings.

EMBODIMENT 1

Figure 1:
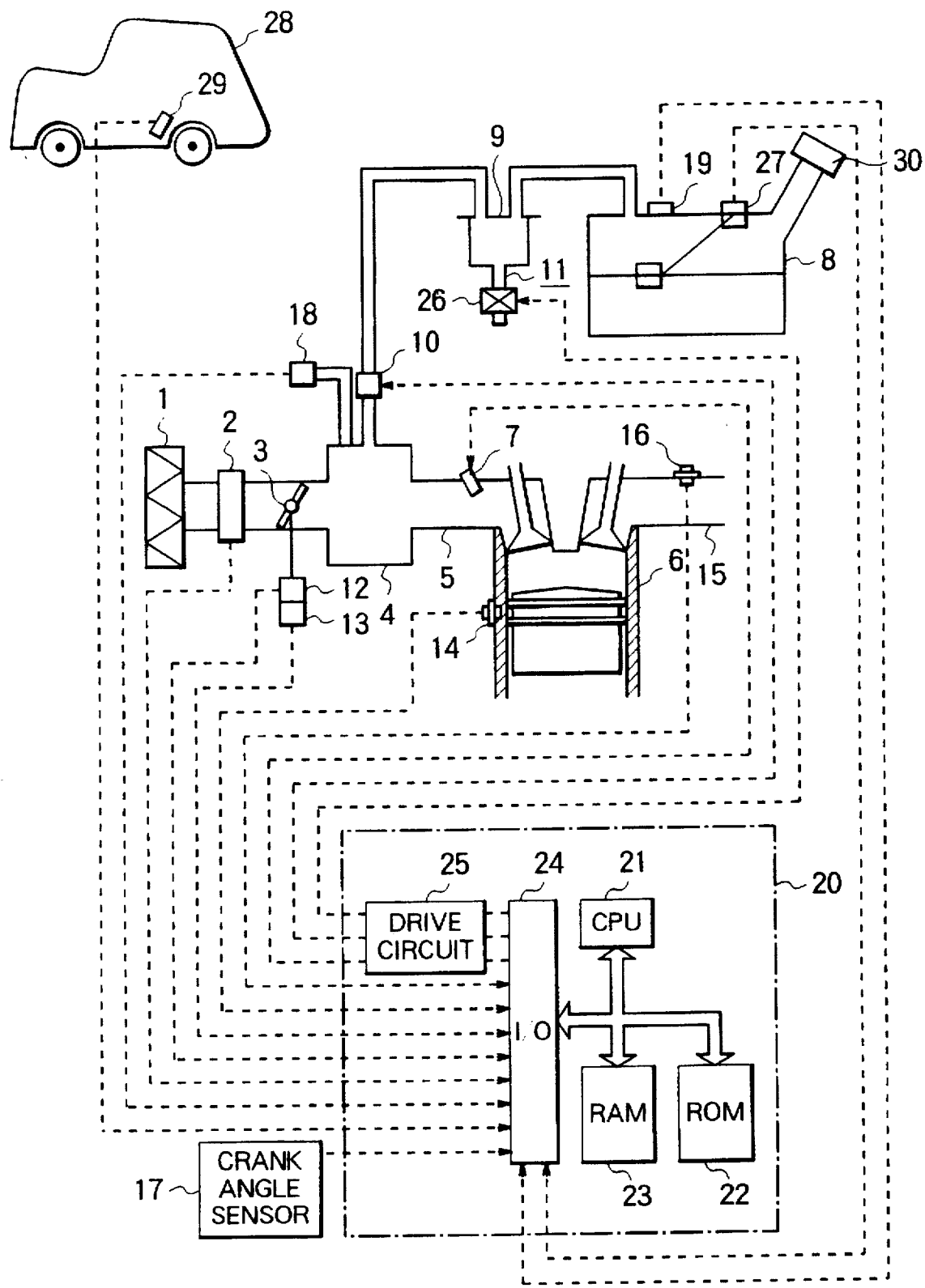
FIG. 1 is a schematic view showing a general construction of an abnormality detecting apparatus for a purge control system in accordance with the present invention.

FIG. 1 illustrates a schematic construction of an internal combustion engine for a vehicle to which an abnormality detection apparatus for a purge control system constructed in accordance with the present invention. In this Figure, air sucked from an air cleaner 1 into an intake pipe 5 is supplied to a plurality of cylinders of an internal combustion engine 6 through an air flow sensor 2, a throttle valve 3 and a surge tank 4 all disposed in the intake pipe 5 in this order downstream of the air cleaner 1. An amount of intake air Qa sucked into the engine 6 through the intake pipe 5 is measured by the air flow sensor 2, and then adjusted by means of the throttle valve 3 in accordance with an engine load.

On the other hand, fuel is injected into the intake pipe 5 through a fuel injector 7. A fuel gas or vapor generated in a fuel tank 8 is adsorbed by an adsorbent in the form of charcoal received in a canister 9. When a purge control valve 10, which serves to adjust an amount of purged fuel gas under the action of duty control, is opened, the fuel gas thus adsorbed is purged, as a purge air or gas which is an air carrying a fuel vapor released from the charcoal, into the surge tank 4 in accordance with a control quantity of the purge valve 10, which is determined on the basis of an operating condition of the engine 6, during air, being introduced into the canister 9 from a canister air valve 26 provided at a canister air port 11 under the action of a negative pressure in the surge tank 4, passes through the charcoal in the canister 9.

An engine control unit 20 for carrying out various kinds of control such as air/fuel ratio control, ignition timing control, etc., comprises a central processing unit (CPU) 21, a read only memory (ROM) 22, a random access memory (RAM) 23, and the like. Input via an input/output (IO) interface 24 to the engine control unit 20 are various control signals which include an intake air amount Qa measured by the air flow sensor 2, a throttle opening θ measured by a throttle sensor 12, an output signal from an idle switch 13 which is turned on when the throttle valve 3 is in an idle opening range, an engine coolant temperature WT measured by an engine coolant sensor 14, an output signal in the form of an air/fuel ratio feedback signal O2 from an air/fuel ratio sensor 16 provided on an exhaust pipe 15, an output signal representative of the number of revolutions per minute of the engine Ne from a crank angle sensor 17, an output signal representative of an intake air pressure Pb in the intake pipe 5 measured by an intake air sensor 18 mounted on the surge tank 4, an output signal representative of a fuel level in the fuel tank 8 measured by a fuel level gage 27 mounted on the fuel tank 8, and an output signal representative of a vehicle speed Vs measured by a speed sensor 29 mounted, for example, on an axle of a wheel of a vehicle 28 on which the engine 6 is installed.

Here, it is to be noted that various sensors such as the air flow sensor 2, the throttle sensor 12, the idle switch 13, the engine coolant sensor 14, the air/fuel ratio sensor 16, the crank angle sensor 17, the intake air pressure sensor 18, the fuel level gage 27, the speed sensor 29 and the like constitute an engine operating state detecting means of the present invention.

The CPU 21 performs an air/fuel ratio feedback control operation based on a control program and various maps stored in the ROM 22, and drives the injector 7 through the drive circuit 25.

The engine control unit 20 not only carries out various controls such as ignition timing control, exhaust gas recirculation (EGR) control, idling rotational number control, etc., but also calculates the concentration of the fuel gas in the purge air based on the amount of purge air sucked in the engine in accordance with the engine operating state and on the air/fuel ratio feedback signal O2.

Figure 2:
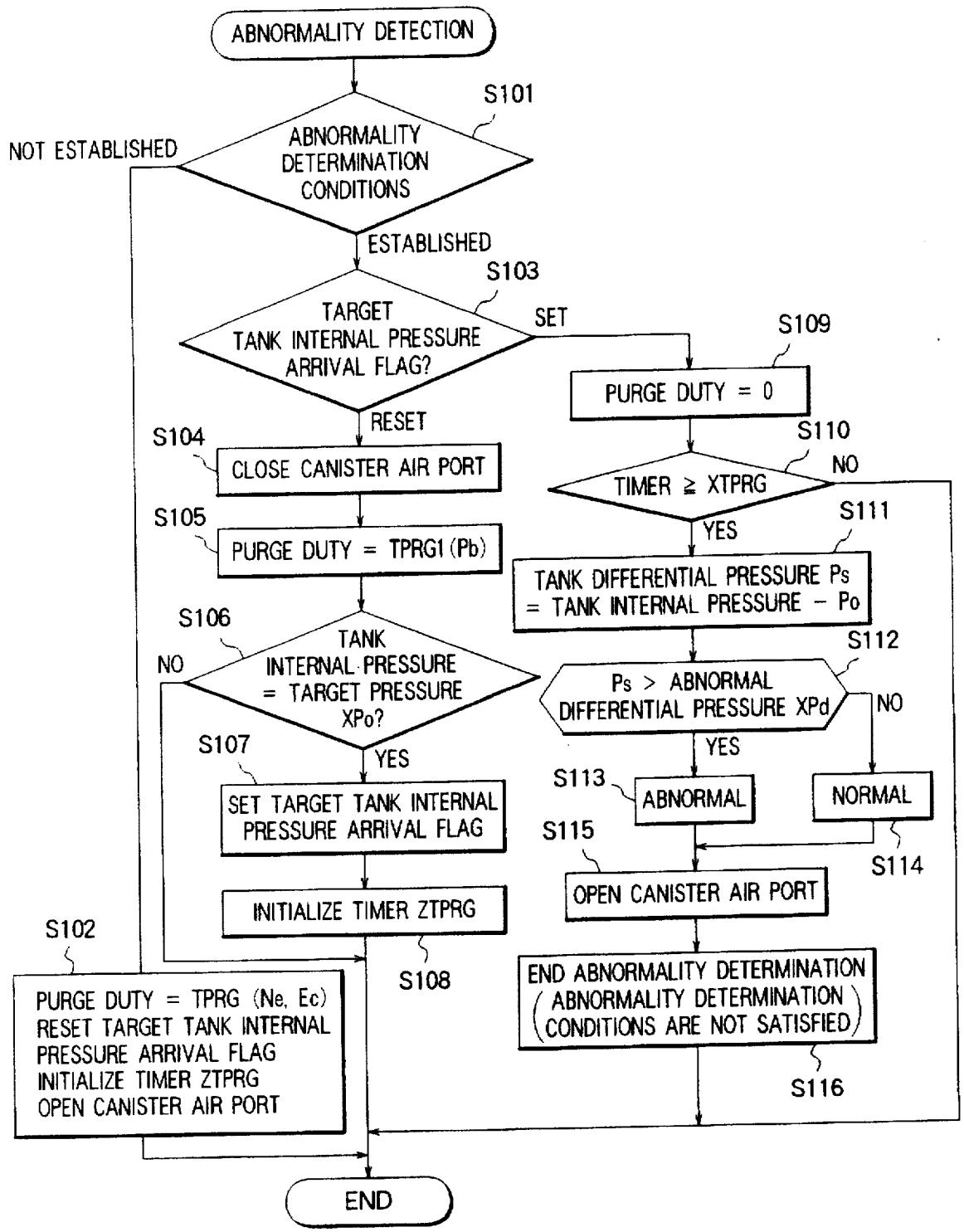
FIG. 2 is a flow chart showing an abnormality detecting process according to a first embodiment of the present invention.

Now, the abnormality detecting operation of this embodiment will be described in detail while referring to FIGS. 2 and 3. FIG. 2 shows an abnormality detecting routine which is fetched at predetermined time intervals.

First, in step S101 in FIG. 2, it is determined whether the current operating state of the engine satisfies the abnormality determination conditions, and if the answer to this question is negative, the control process proceeds to step S102 where the purge duty is set to a value which is mapped from an engine rotational number (i.e., the number of revolutions per minute of the engine) Ne and a charging efficiency Ec (not shown) determined from the engine rotational number Ne and the amount of intake air Qa, while at the same time resetting a target fuel tank internal pressure arrival flag, and initializes the timer ZTPRG to zero after the fuel tank internal pressure has reached a target fuel tank internal pressure, and opens the canister air valve 26 to communicate the canister air port 11 into the ambient atmosphere.

On the other hand, if it is determined in step S101 that the engine operating state satisfies the abnormality determining conditions (i.e., the answer is positive), the control process proceeds to step S103 where the state of the target fuel tank internal pressure arrival flag is checked which indicates that the fuel tank internal pressure Pt detected by the fuel tank internal pressure sensor 19 mounted on the fuel tank 8 has already reached a target fuel tank internal pressure XPO. If the target fuel tank internal pressure flag indicates that the fuel tank internal pressure Pt has not yet reached the target fuel tank internal pressure XPO (i.e., the flag is reset), the control process proceeds to step S104 where the canister air valve 26 is closed to block communication of the canister air port with the ambient atmosphere, and then in step S105, the purge duty is set to a value TPRG1 (Pb) mapped from the intake pressure Pb.

Figure 3:
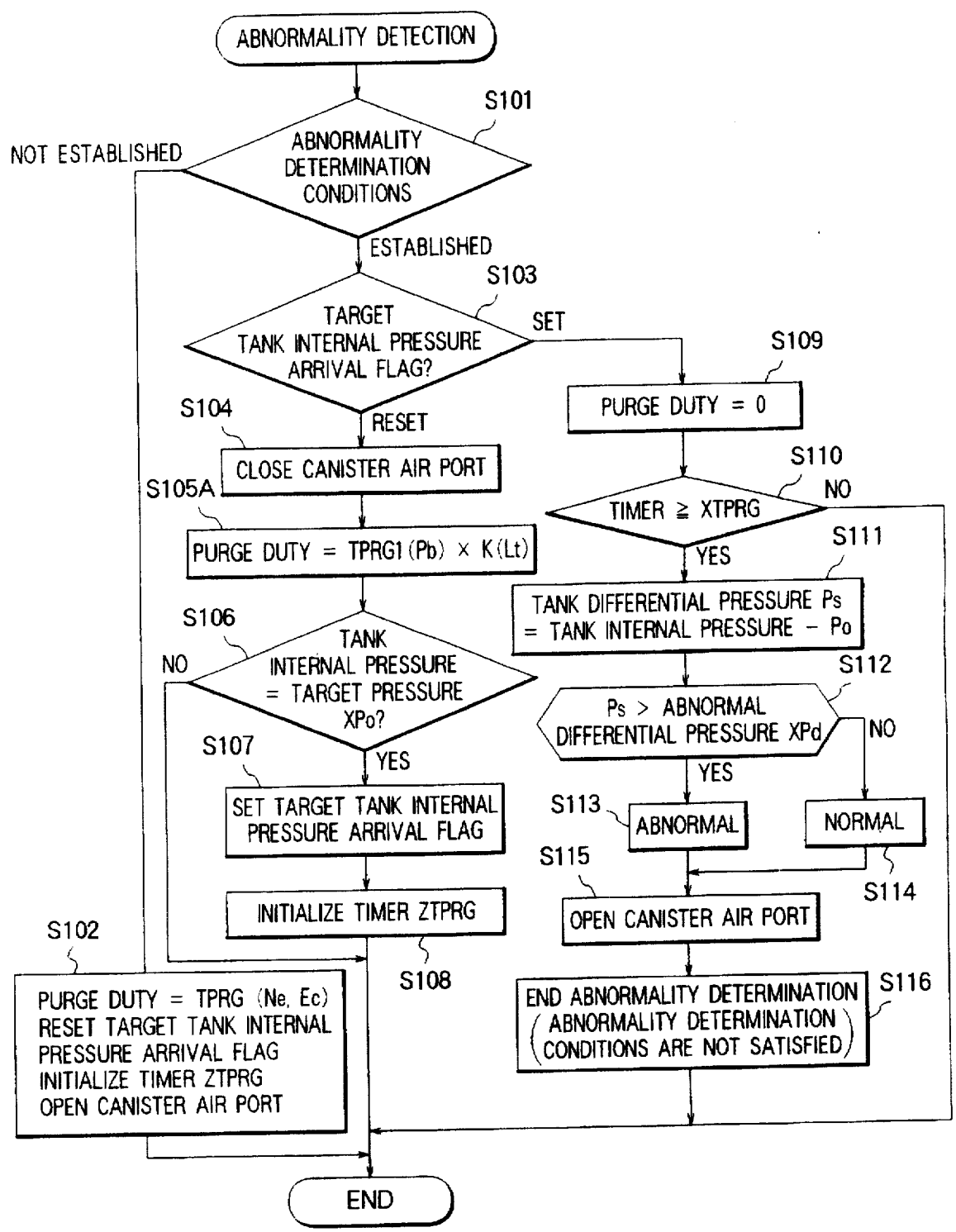
FIG. 3 is a flow chart showing an abnormality detecting process according to a modification of the first embodiment of the present invention.

Here, it is to be noted that the purge duty can be a value which is a mapped value TPRG1 (Pb) of the intake pressure Pb multiplied by a coefficient K(Lt) mapped from the fuel level Lt, as shown in step S105A in FIG. 3. The other processings in FIG. 3 are the same as those in FIG. 2.

Subsequently, in step S106, it is determined whether the fuel tank internal pressure Pt is equal to the target fuel tank internal pressure XPO, and if the answer to this question is negative, the processings of FIG. 2 end.

On the other hand, if it is determined in step S106 that the fuel tank internal pressure Pt is equal to the target fuel tank internal pressure XPO (the answer is positive), the control process proceeds to step S107 where the target fuel tank internal pressure arrival flag is set, and then to step S108 where the timer ZTPRG is initialized to zero after the target fuel tank internal pressure has been reached. Thereafter, the processings of FIG. 2 end.

Though not shown here, the timer ZTPRG is always incremented after arrival of the target fuel tank internal pressure.

If in step S103 the fuel tank internal pressure Pt has reached the target fuel tank internal pressure XPO (i.e., the flag is set), the control process proceeds to step S109 where the purge duty is set to zero and inflow of the fuel gas into the surge tank 4 is stopped. Subsequently, in step S110, it is determined whether the reading of the timer ZTPRG after arrival of the target fuel tank internal pressure is equal to or greater than a predetermined time XTPRG. If the answer to this question is negative, the processings of FIG. 2 end.

If, however, it is determined in step S10 that the reading of the timer ZTPRG after arrival of the target fuel tank internal pressure is equal to or greater than the predetermined time XTPRG (i.e., the answer is positive), the control process proceeds to step S1 where a difference between the current fuel tank internal pressure Pt and the target fuel tank internal pressure P0 is set as a fuel tank differential pressure Ps, and then to step S112.

In step S112, it is determined whether the fuel tank differential pressure Ps is equal to or greater than an abnormal pressure differential XPd, and if the answer to this question is positive, the control process proceeds to step S113 where it is determined that there is an abnormality or failure in the system. On the other hand, if the answer is negative, the control process proceeds to step S114 where it is determined that the system is normal.

Thereafter, in step S115, the canister air valve 26 is opened to establish communication between the canister air port 11 and the ambient atmosphere, and then in step S116, the abnormality determination is ended while making the abnormality determining conditions unsatisfied at all times, thus finishing the processing of FIG. 2.

Figure 4:
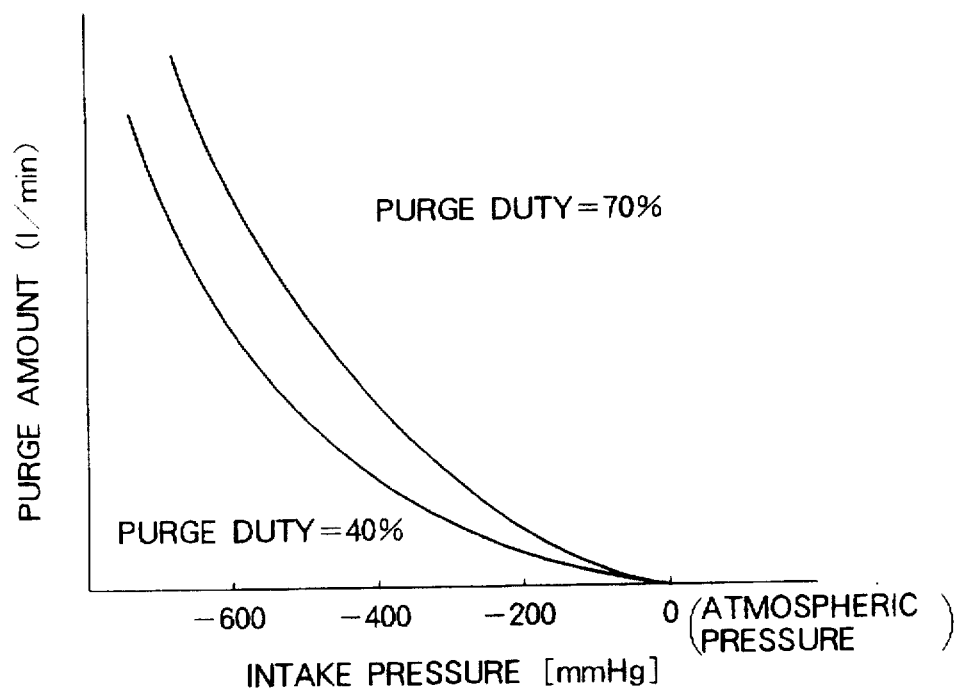
FIG. 4 is a graph showing a relationship between a negative pressure in an engine intake pipe and an amount of fuel gas purge from a fuel tank.
Figure 6:
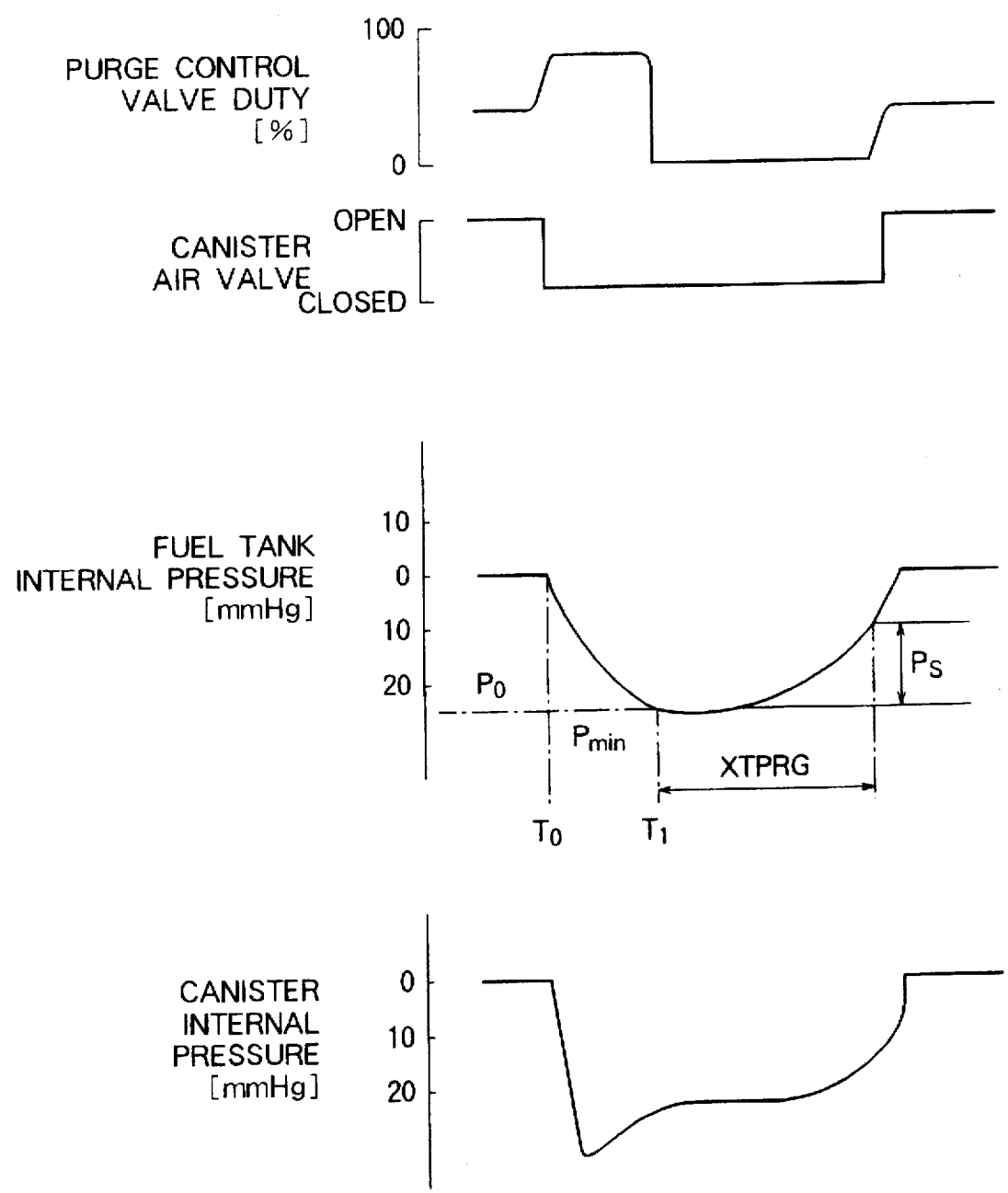
FIG. 6 is an explanatory view showing the operation of a fuel purge system during an abnormality detecting process according to the present invention, i.e., operational relationships between a duty of a purge control valve, a canister vent valve, an internal pressure in a fuel tank and an internal pressure in a canister.
Figure 7:
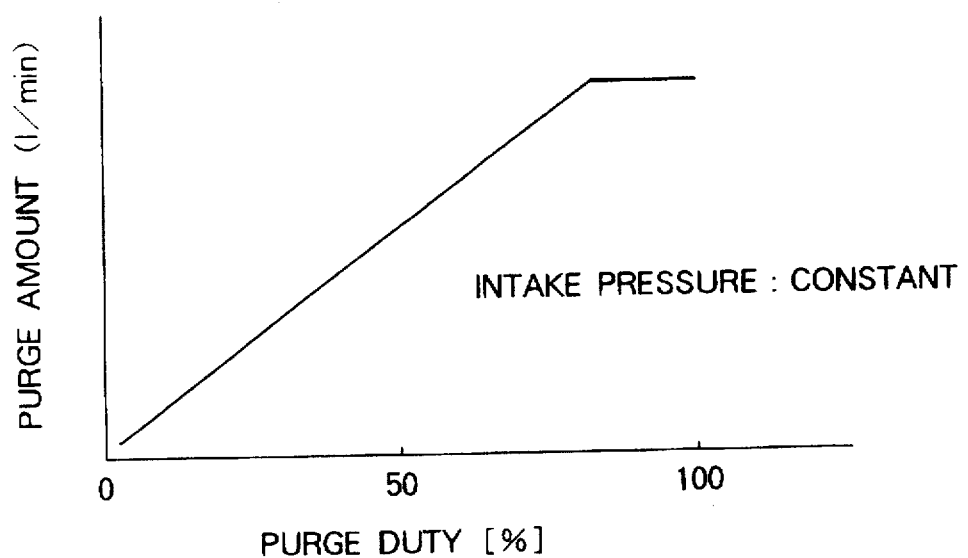
FIG. 7 is an explanatory view showing a relationship between a purge duty and a purge amount when the negative pressure in the intake pipe is constant.

As shown in FIG. 7, in cases where the intake pressure (the pressure in the intake pipe measured with the atmospheric pressure being taken as a reference) is constant, the purge duty and the amount of purged fuel gas are in a proportional relationship with respect to each other, but the purge amount is varied depending upon the intake pressure even with the same purge duty, as illustrated in FIG. 4. Moreover, if the purge duty is set to a certain value with the canister air valve 26 being closed, a certain relationship is established between the fuel tank internal pressure and the internal pressure in the canister 9 due to a flow resistance in the purge conduit and the like, as clearly shown in FIG. 6.

That is, the canister internal pressure once drops to a substantially low value, so that the fuel tank internal pressure continues, even after closure of the purge valve 26, to drop to a value in which a state of equilibrium between the fuel tank internal pressure and the canister internal pressure is established, and thus the fuel tank internal pressure is subjected to undershooting.

In other words, in order to permit the fuel tank internal pressure to quickly drop with a limited amount of undershoot during the abnormality determination, the purge duty during the abnormality determination must be determined while taking account of the intake pressure which varies in accordance with the engine operating state.

Figure 5:
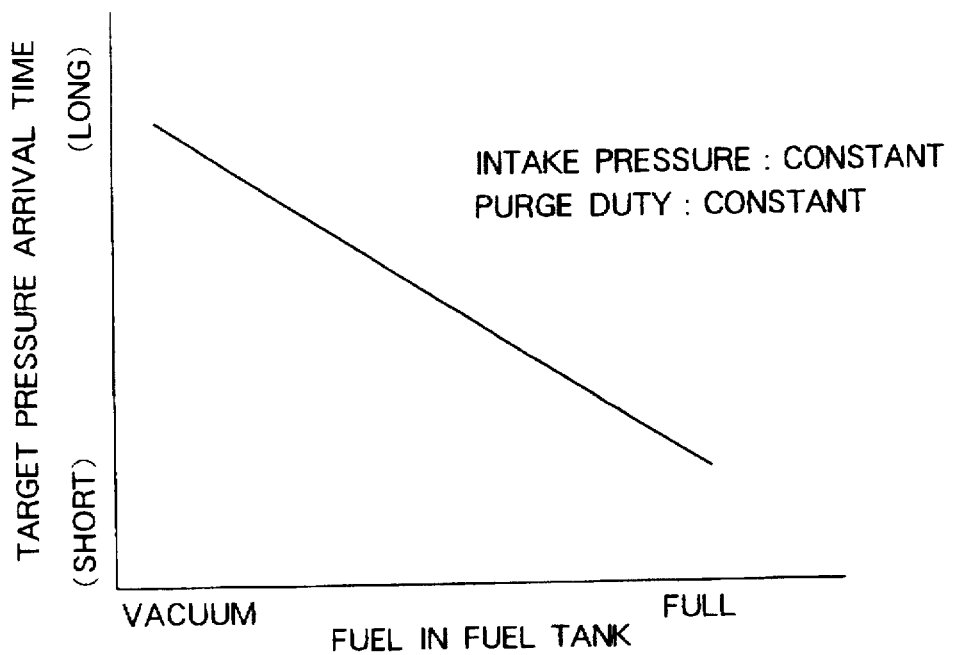
FIG. 5 is a graph showing a relationship between an amount of fuel in a fuel tank and a target pressure arrival time.

Since the fuel tank internal pressure depends on the concentration of air in the fuel tank, as shown in FIG. 5, the rate of dropping or decrease of the fuel tank internal pressure varies depending upon the amount of fuel in the fuel tank 8 even with the same or constant purge amount (i.e., constant intake pressure and constant purge duty). Thus, in order to allow the fuel tank internal pressure to quickly drop with a limited amount of undershoot during the abnormality determination, the amount of fuel in the fuel tank 8 must be taken into account in determining the purge duty during the abnormality determination.

EMBODIMENT 2

Figure 8:
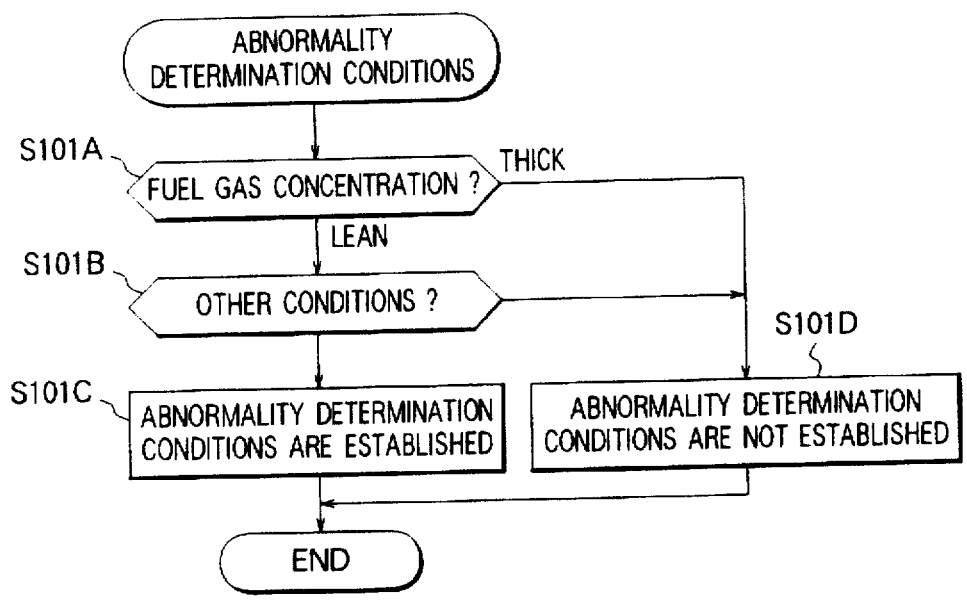
FIG. 8 is a flow chart showing abnormality determination conditions according to a second embodiment of the present invention.
Figure 9:
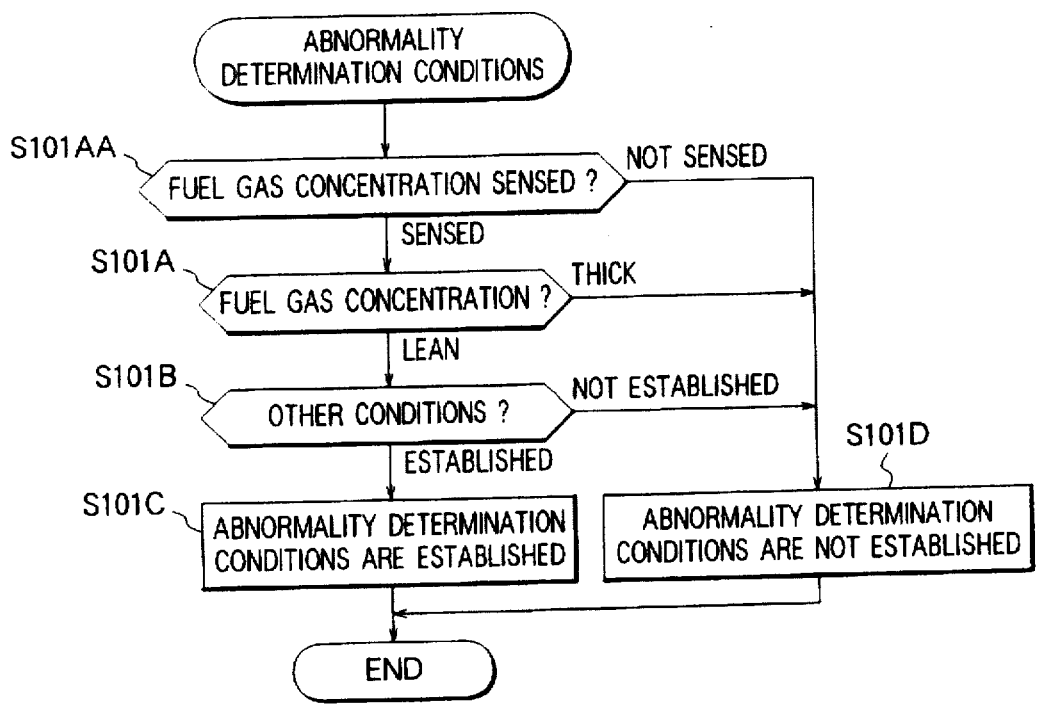
FIG. 9 is a flow chart showing a modification of abnormality determination conditions according to the second embodiment of the present invention.
Figure 10:
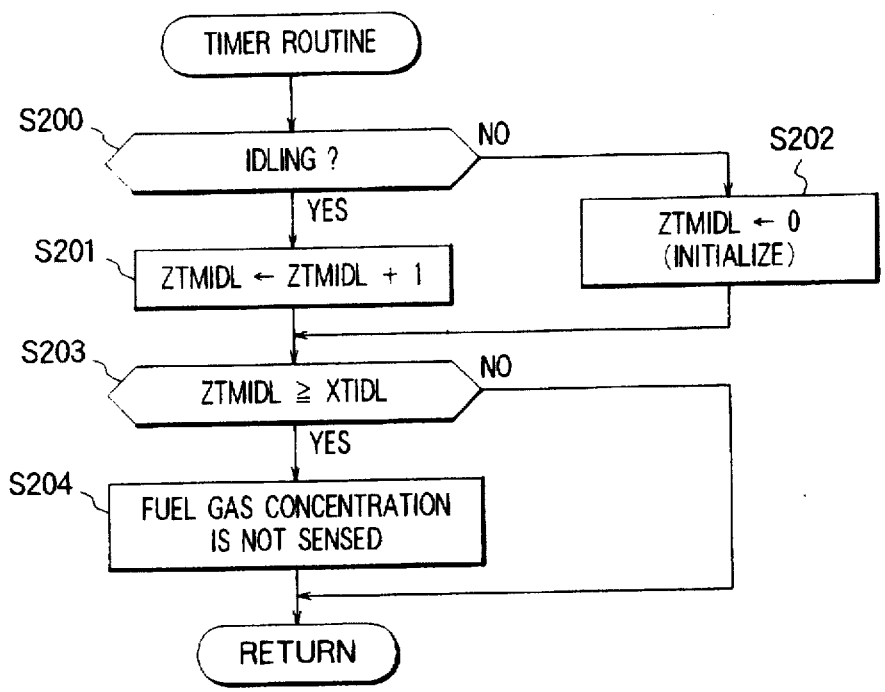
FIG. 10 is a flow chart showing a timer routine according to the second embodiment of the present invention.

FIGS. 8, 9 and 10 illustrate an abnormality detecting operation in accordance with a second embodiment of the present invention.

FIG. 8 shows a detailed content of the step S191 of the abnormality detecting routine shown in FIGS. 2 and 3, which is fetched at predetermined time intervals.

First, in step S101A in FIG. 8, it is determined whether the concentration of a fuel gas detected by an unillustrated method is rich or lean, namely greater than a predetermined reference value, and if the fuel gas concentration is determined to be rich, the control process goes to step S101D where it is determined that the abnormality determining condition is not satisfied, or if otherwise (lean), the control process goes to step S101B where the other abnormality determining conditions are checked. If all the other conditions are satisfied, it is determined in step S101C that the abnormality determining conditions are established.

FIG. 9 also illustrates a detailed content of the step S101 in the abnormality detecting routine shown in FIGS. 2 and 3, which is fetched at predetermined time intervals. Here, it is to be noted that the routine of FIG. 9 is different from that of FIG. 8 in that in the former, it is checked in step S101AA whether the concentration of a fuel gas has been detected, and if such a detection is not finished, the control process proceeds to step S101D where it is determined that all the abnormality determining conditions are not satisfied.

FIG. 10 shows a timer routine executed at predetermined time intervals, wherein an idling state continuation time ZTMIDL is measured, and if the idling state continuation time ZTMIDL is greater than a reference value XTIDL, it is determined that the fuel gas concentration has not yet been detected.

In step S200 in FIG. 10, it is determined, according to an unillustrated method, whether the engine is idling, and if it is determined that the engine is not idling (i.e., the answer is negative), the control process goes to step S202 where the continuation time ZTMIDL is initialized to zero, and then to step S203.

On the other hand, it is determined in step S200 that the engine is idling (i.e., the answer is positive), the control process goes to step S201 where the idling state continuation time ZTMIDL is incremented, and then to step S203.

In step S203, it is determined whether the idling state continuation time ZTMIDL is equal to or greater than a predetermined length of time XTIDL, and if not, the routine of FIG. 10 ends. On the contrary, if the answer is positive in step S203 (ZTMIDL XTIDL), the control process goes to step S204 wherein it is determined that the fuel gas concentration has not yet been detected, and the routine of FIG. 10 ends.

Thereafter, if it is determined that detection of the fuel gas concentration is not yet been finished, the step S101M in the abnormality determining conditions is not satisfied, so the abnormality determining conditions are not established.

In other words, during the idling state of the engine in which the purge amount is limited or zero, if the idling state continues long, the actual concentration of a fuel gas can sometimes be higher than that detected during non-idling, so that if an abnormality determination is carried out in such a situation, the engine will be troubled. Accordingly, in such a case, abnormality determination must be made after the detection of the fuel gas concentration has been finished.

As can be seen from the above, only when the fuel gas concentration is reliably determined to be lean, the abnormality determining conditions are made to be established, so that a rich fuel gas is prevented from being introduced into the engine during the time abnormality determination is being carried out, thus avoiding irregular or abnormal engine operation.

EMBODIMENT 3

Figure 11:
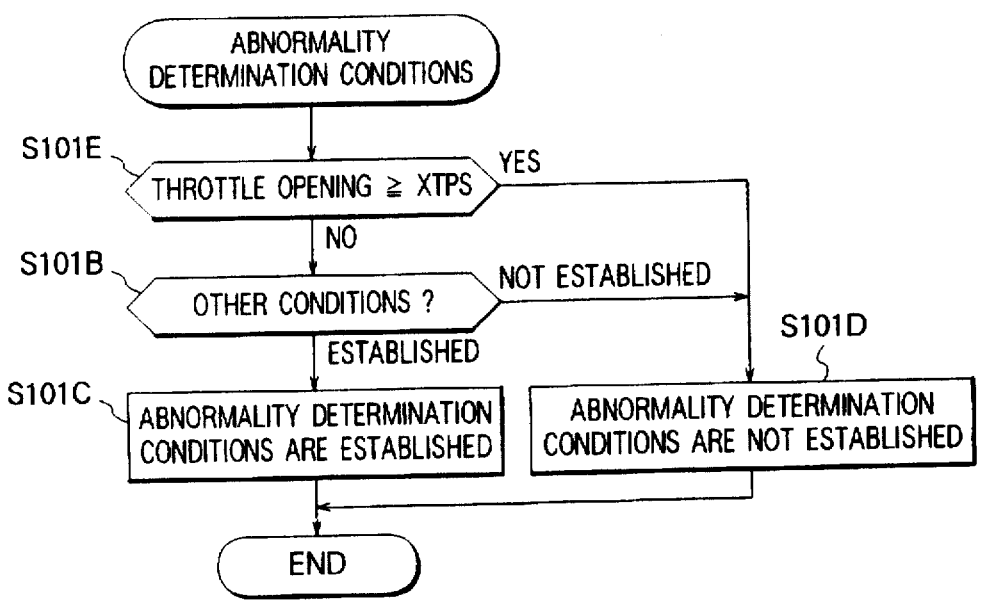
FIG. 11 is a flow chart showing abnormality determination conditions according to a third embodiment of the present invention.
Figure 12:
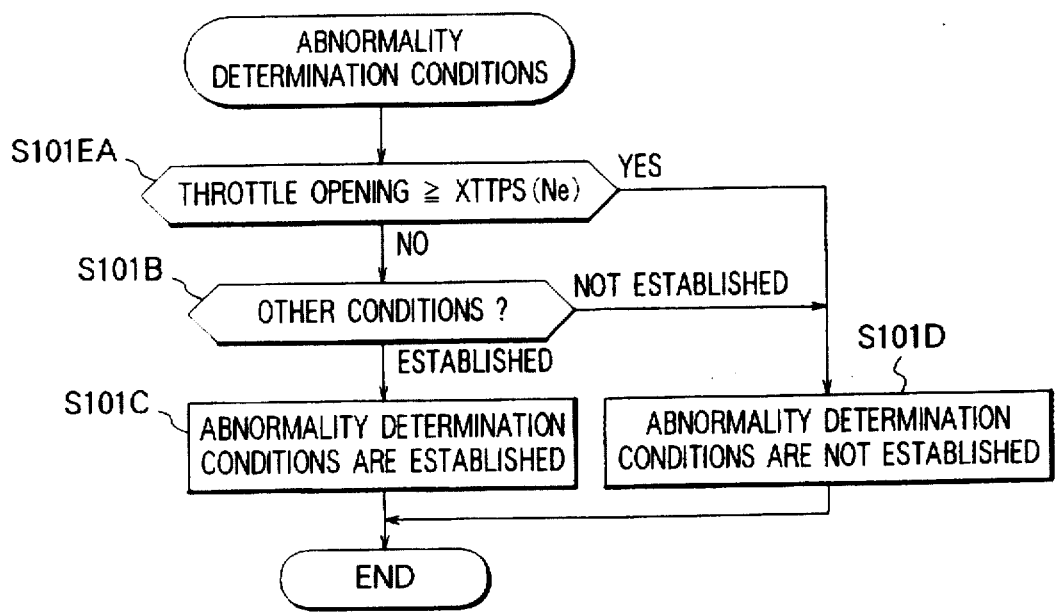
FIG. 12 is a flow chart showing a modification of abnormality determination conditions according to the third embodiment of the present invention.

FIGS. 11 and 12 illustrate the abnormality detecting operation according to a third embodiment of the present invention. FIG. 11 illustrates a detailed content of the step S101 of the abnormality detecting routine shown in FIGS. 2 and 3, which is fetched at predetermined time intervals.

First, in step S101E in FIG. 11, it is determined whether the throttle opening θ is equal to or greater than a predetermined reference value XTPS, and if the answer to this question is positive (θ≧XTPS), the control process goes to step S101D where it is determined that the abnormality determining conditions are not established. On the other hand, if the answer in step S101E is negative (θ<XTPS), the control process goes to step S101B where the other conditions are checked, and if all these conditions are satisfied, it is then determined in step S101C that the abnormality determining conditions are established.

Here, the value to be compared with the throttle opening θ can be a mapped value of the engine rotational number XTTPS (Ne) as shown in step S101EA in FIG. 12.

As described above, if the throttle opening θ is greater than a predetermined value (i.e., the intake pressure is low), no abnormality determination is effected, so that a situation can be avoided in which the purge amount does not increase in accordance with the increasing purge duty, as can be seen from FIG. 4. This serves to enhance reliability in the abnormality determination.

EMBODIMENT 4

Figure 13:
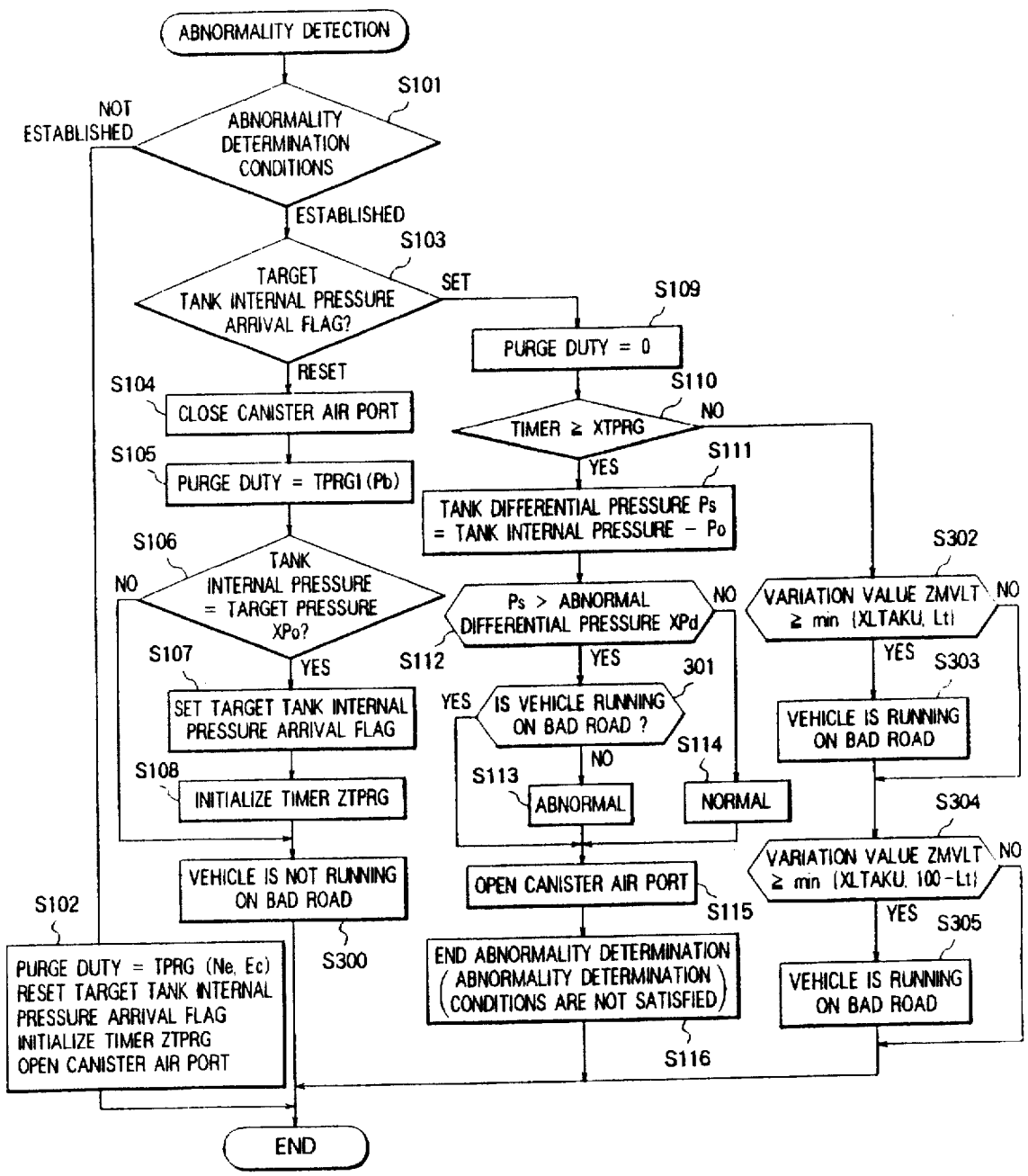
FIG. 13 is a flow chart showing an abnormality detecting process according to a fourth embodiment of the present invention.

FIG. 13 illustrates an abnormality detecting routine describing the abnormality detecting operation according to a fourth embodiment of the present invention. The abnormality detecting routine of FIG. 13 is fetched at predetermined time intervals and it is substantially the same as that of FIG. 2 except for the following aspects which will be described below.

In step S300, if the fuel tank internal pressure has not yet reached the target fuel tank internal pressure upon abnormality detection, it is judged that a bad road running determination is negative (i.e., the vehicle is not running on a bad road). That is, a determination of bad road running is made when the purge duty is equal to zero in which the purge conduit is closed or in a closed space.

In step S302, during a period of time until the timer ZTPRG reaches XTPRG after the closing of the purge conduit, it is determined whether a variation ZMVLT in the amount of fuel remaining in the fuel tank 8 measured in an unillustrated manner is equal to or greater than the lesser one of the bad road detection determination value XLTAKU and the fuel amount Lt in the fuel tank (i.e., 100% at full and 0% at vacant), and if the answer to this question is positive, the control process proceeds to step S303 where a determination is made that the vehicle is traveling on a bad road.

Subsequently, in step S304, it is further determined whether the fuel amount variation value ZMVLT is equal to or greater than the lesser one of the bad road determination value XLTAKU and a value of 100-Lt. If the answer is positive, the control process proceeds to step S305 where a bad road running determination is made.

On the basis of the results (bad road traveling or not) thus obtained, when a bad road traveling determination is made in step S301 (i.e., a positive determination), the control process does not proceed to step S113 even if it is determined in step S112 that the fuel tank differential pressure Ps is greater than the abnormal differential pressure XPd. Thus, in this case, a determination of abnormality (i.e., determination of the system being abnormal) is eventually invalidated.

As described above, in cases where with the fuel amount in the fuel tank 8 being nearly full or vacant, reading at the fuel level gauge 27 will not change greatly (i.e., the fuel level gauge 27 is not able to move greatly) despite the fact the vehicle is traveling on a bad road, a determination of bad road traveling can be made correctly, preventing miss judgement and improving reliability in abnormality detection.

EMBODIMENT 5

Figure 14:
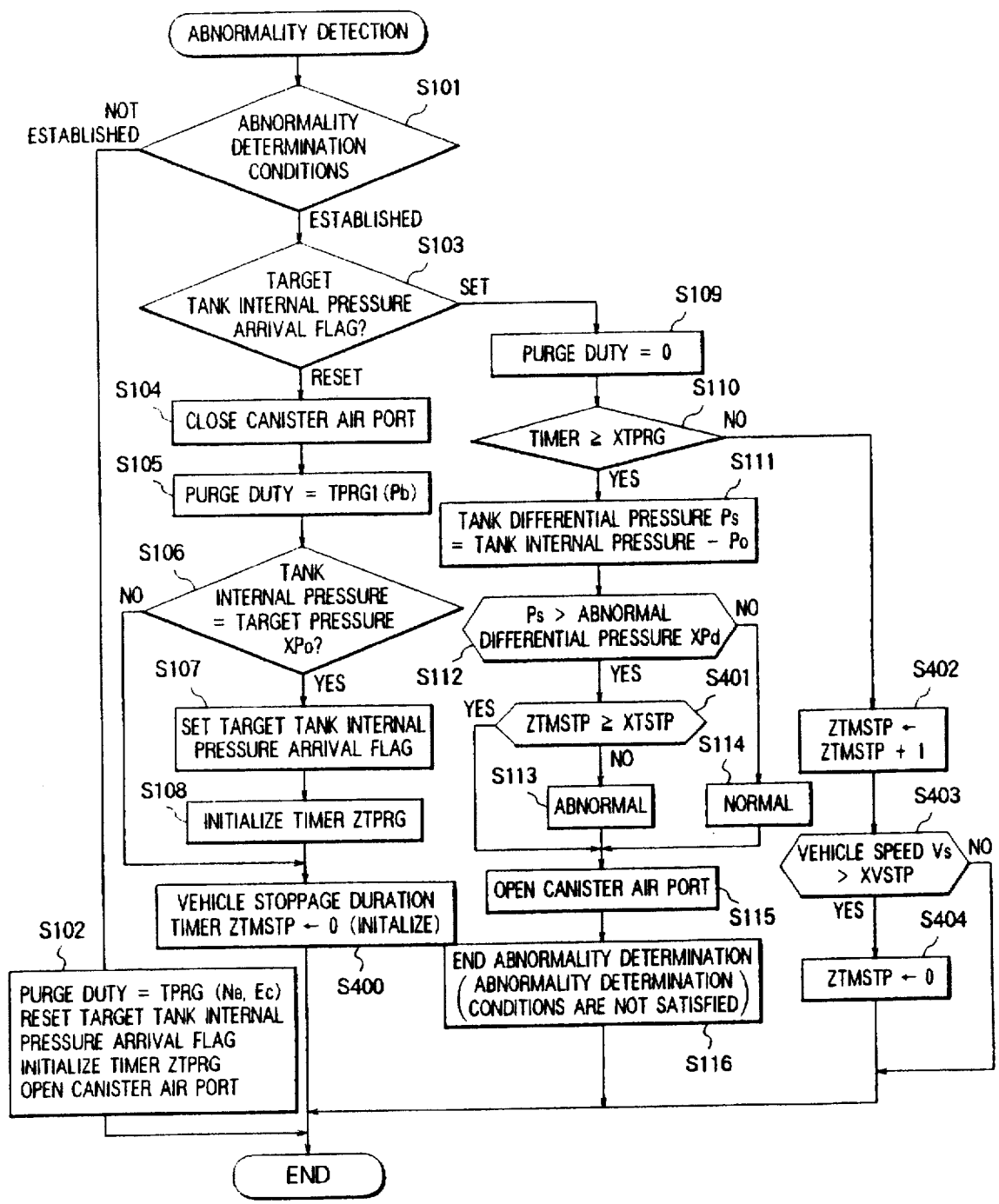
FIG. 14 is a flow chart showing an abnormality detecting process according to a fifth embodiment of the present invention.

FIG. 14 illustrates an operation of abnormality detection in accordance with a fifth embodiment of the present invention. Specifically, FIG. 14 is an abnormality detecting routine which is called at predetermined time intervals. Here, description is made only for that portion of this routine which is different from the routine of FIG. 2.

In step S400, when the target fuel tank internal pressure is not reached upon detection of an abnormality, vehicle stoppage cumulative time measuring means in the form of a vehicle stoppage duration timer ZTMSTP is always initialized to zero, that is a determination of vehicle stop continuation is made only at the time of the purge conduit being closed.

Step S402 shows that the vehicle stoppage duration timer ZTSTP is always incremented until the timer ZTPRG arrives at XTPRG after the purge conduit has been closed (a closed space).

In Step S403, it is determined whether the vehicle speed Vs is greater than a vehicle stop determination speed XVSTP. If the answer to this question is positive, the control process proceeds to step S404 where the vehicle stoppage duration timer ZTMSTP is initialized to zero. On the contrary, if the vehicle speed Vs is less than the vehicle stop determination speed XVSTP (i.e., the vehicle is stopped), the vehicle stoppage duration timer ZTSTP is not initialized to zero, but instead incremented in step S402.

Then, based on the thus obtained result (the vehicle stoppage duration timer ZTSTP), when in step S401 it is determined that the vehicle stoppage duration timer ZTSTP is equal to or greater than the predetermined value XTSTP (i.e., the answer is positive), the control process does not goes to step S113, thus substantially disabling the abnormality determination even if it is determined in step S112 that the fuel tank differential pressure Ps is greater than the abnormal pressure difference XPd.

As can be seen from the above, incorrect abnormality determination in cases where a filler cap 30 of a fuel tank (see FIG. 1) is opened for replenishment of fuel after the target fuel tank internal pressure is reached during abnormality determination, thereby enhancing reliability in abnormality detection.

EMBODIMENT 6

Figure 15:
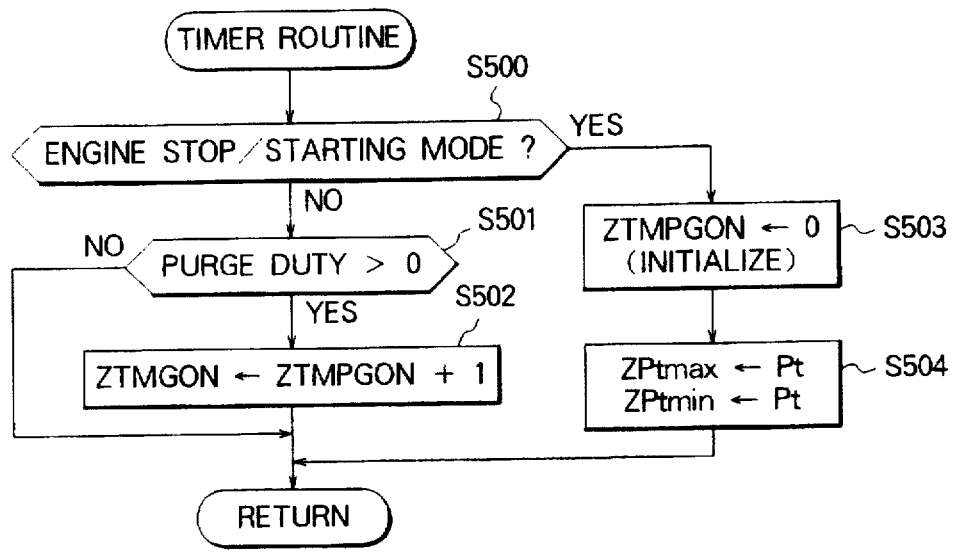
FIG. 15 is a flow chart showing a timer routine according to a sixth embodiment of the present invention.
Figure 16:
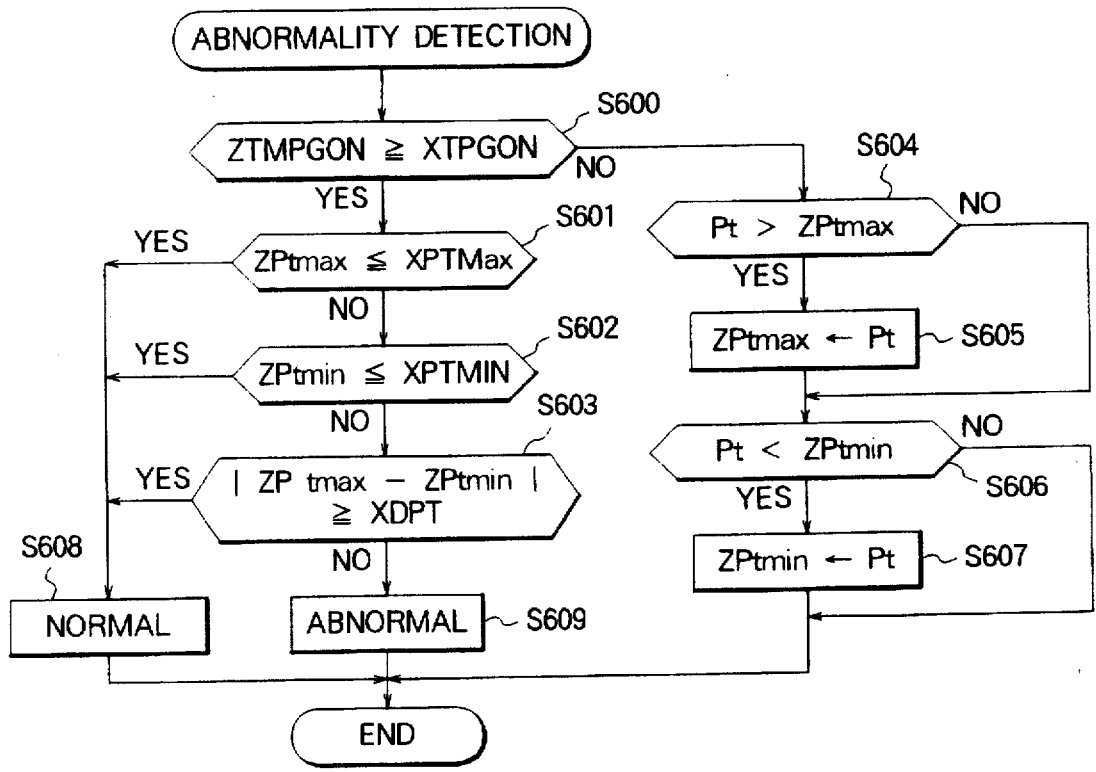
FIG. 16 is a flow chart showing an abnormality detecting process according to the sixth embodiment of the present invention.

FIGS. 15 and 16 illustrate an abnormality detection operation in accordance with a sixth embodiment of the present invention. Specifically, FIG. 15 is a timer routine which is executed at predetermined time intervals for cumulative time metering.

First, in step S500 in FIG. 15, based on unillustrated processing, it is determined whether the engine is stopped or in a starting mode. If it is determined that the engine is stopped or in a starting operation (i.e., the answer is positive), then the control process proceeds to step S503 where a cumulative purge time ZTMPGON after engine starting is initialized to zero, and the control process proceeds to step S504 where the maximum fuel tank internal pressure ZPtmax and the minimum fuel tank internal pressure ZPtmin are both initialized.

On the other hand, if in step S500 it is determined that the engine is not stopped nor in the starting mode (i.e., the answer is negative), the control process proceeds to step S501 where it is determined whether the purge duty is greater than zero (i.e., whether purged fuel is introduced). If the purge duty is zero (i.e., the answer is negative), the routine of FIG. 15 ends.

On the other hand, if it is determined in step S501 that the purge duty is greater than zero (i.e., the answer is positive), the control process proceeds to step S502 where the cumulative purge time ZTMPGON after engine starting is incremented and then the routine of FIG. 15 ends.

Subsequently, abnormality determination such as, for example, opening of the fuel tank (i.e., the filler cap 30 is open) is effected in accordance with the flowchart of FIG. 16. In the abnormality detection routine called at predetermined time intervals, abnormality determination is successively effected based on the maximum and minimum values and the difference therebetween of the fuel tank internal pressure until the cumulative purge time ZTMPGON obtained in the routine of FIG. 15 reaches a predetermined time XTPGON.

Specifically, in step S600, it is determined whether the cumulative purge time ZTMPGON has elapsed the predetermined time XTPGON. If the answer to this question is negative, then the control process proceeds to steps S604, S605 for updating the maximum fuel tank internal pressure ZPtmax, and also to steps S606, S607 for updating the minimum fuel tank internal pressure ZPtmin. After updating of the maximum and minimum pressures, this routine ends.

In step S600, it is determined whether the cumulative purge time ZTMPGON has elapsed more than the predetermined time XTPGON. If the answer to this question is positive, the control process proceeds to step S601 where it is determined whether the maximum fuel tank internal pressure ZPtmax is equal to or greater than a predetermined value XPTMAX. If the answer to this question is positive, the control process proceeds to step S608 where a determination of normality (i.e., the system is normal) is made, and then the control process ends.

On the contrary, if it is determined in step S601 that the maximum fuel tank internal pressure ZPtmax is less than the predetermined value XPTMAX (i.e., the answer is negative), the control process proceeds to step S602 where it is determined whether the minimum fuel tank internal pressure ZPtmin is less than a predetermined value XPTMIN. If the answer to this question is positive, the control process proceeds to step S608 where a normality determination is made, and then the control process ends.

On the other hand, if it is determined in step S602 that the minimum fuel tank internal pressure ZPtmix is greater than the predetermined value XPTMIN (i.e., the answer is negative), the control process proceeds to step S603 where it is determined whether a difference between the maximum fuel tank internal pressure ZPtmax and the minimum fuel tank internal pressure ZPtmix is equal to or greater than a predetermined value XDPT. If the answer to this question is positive, the control process proceeds to step S608 where a normality determination is made, and then the control process ends.

On the contrary, if it is determined in step S603 that the difference between the maximum fuel tank internal pressure ZPtmax and the minimum fuel tank internal pressure ZPtmix is less than the predetermined value XDPT (i.e., the answer is negative), the control process proceeds to step S609 where a determination of abnormality (i.e., the system is abnormal) is made, and then this routine ends.

As described above, in the event that there exists a large amount of fuel leakage which would be caused due to the open filler cap 30, dislocation of the purge conduit such as a rubber hose, etc., the fuel tank internal pressure, remaining substantially unchanged and being held nearly at the atmospheric pressure, is advantageously utilized for providing speedy and reliable abnormality detection.

What is claimed is:

1. An abnormality detection apparatus for use with a fuel purge system including a canister with a fuel adsorbent received therein disposed in a fuel purge conduit connecting between a fuel tank and an intake pipe of an internal combustion engine for adsorbing fuel gas generated in said fuel tank, and a purge control valve in said purge passage adapted to be controlled to be opened or closed in accordance with an engine operating state so as to introduce at appropriate timing the adsorbed fuel gas into the intake passage for preventing evaporated fuel gas from discharged into the ambient atmosphere, said apparatus comprising:

sensor means for sensing the engine operating state;

abnormality determination detecting means for detecting, based on the engine operating state sensed by said sensor means, whether abnormality determination conditions for said fuel purge system are established;

air port closing means for closing an air port formed in said canister;

closed loop forming means for closing said purge control valve and said air port closing means to thereby form said entire fuel purge system into a single closed space;

fuel tank internal pressure sensing means for sensing an internal pressure in said fuel tank;

abnormality detecting means for detecting the presence of abnormality in said fuel purge system based on the result of detection of said fuel tank internal pressure sensing means;

intake pressure sensing means for sensing a pressure in said intake pipe; and purge control means for controlling an amount of purged fuel depending upon the sensed intake pressure when said abnormality determination conditions are established.

2. The abnormality detecting apparatus as claimed in claim 1, further comprising fuel amount sensing means for sensing an amount of fuel in said fuel tank, wherein said purge control means controls the amount of fuel purge in accordance with the amount of fuel in said fuel tank sensed by said fuel amount sensing means.

3. The abnormality detecting apparatus as claimed in claim 1, further comprising fuel gas concentration sensing means for sensing a concentration of a fuel gas flowing from said canister into said intake pipe, wherein when the concentration of the fuel gas sensed by said fuel gas concentration sensing means is greater than a predetermined value, said abnormality determination condition detecting means determines that the abnormality determination conditions are not established.

4. The abnormality detecting apparatus as claimed in claim 3, wherein when the fuel gas concentration has not yet been sensed by said fuel gas concentration sensing means, said abnormality determination condition detecting means determines that the abnormality determination conditions are not established.

5. The abnormality detecting apparatus as claimed in claim 3, wherein said sensor means comprises an idle time measuring sensor for measuring a duration time of the engine idling condition, wherein when the duration time of the engine idling condition measured by said idle time measuring sensor is greater than a predetermined time, it is determined that the fuel gas has not yet been sensed by said fuel gas concentration sensing means so that said abnormality determination condition detecting means determines that the abnormality determination conditions are not established.

6. The abnormality detecting apparatus as claimed in claim 1, wherein said sensor means comprises a throttle sensor for sensing an opening degree of said throttle valve, and when the opening degree of said throttle valve sensed by said throttle sensor is greater than a predetermined value, said abnormality determination condition detecting means determines that the abnormality determination conditions are not established.

7. The abnormality detecting apparatus as claimed in claim 2, further comprising fuel amount variation sensing means for sensing an amount of fuel variation in said fuel tank and substantially invalidating the abnormality detection of said abnormality detection means when the amount of fuel in said fuel tank sensed by said fuel amount sensing means varies by more than a predetermined variation determining value, and wherein said variation determining value in said fuel amount variation sensing means is changed depending upon the amount of fuel in said fuel tank.

8. The abnormality detecting apparatus as claimed in claim 1, wherein said sensor means comprises a speed sensor for sensing a speed of a vehicle on which said internal combustion engine is installed, said abnormality detecting apparatus further comprising vehicle stoppage cumulative time measuring means for measuring a length of cumulative time of the vehicle stoppage when said abnormality determination conditions are established, wherein when the vehicle stoppage cumulative time measured by said vehicle stoppage cumulative time measuring means is greater than a predetermined value, the abnormality detection of said abnormality detection means is invalidated.

9. The abnormality detecting apparatus as claimed in claim 1, further comprising cumulative purge time measuring means for measuring a cumulative purge time after engine starting;

maximum fuel tank internal pressure storing means for storing a maximum value of the internal pressure in said fuel tank after engine starting; and minimum fuel tank internal pressure storing means for storing a minimum value of the internal pressure in said fuel tank after engine starting;

wherein an abnormality of said fuel purge system is determined based on the maximum and minimum values of the fuel tank internal pressure measured when the cumulative purge time measured by said cumulative purge time measuring means reaches a predetermined time.

\* \* \* \* \*